(12) United States Patent
Belen, III

(10) Patent No.: US 12,741,758 B2
(45) Date of Patent: Sep. 22, 2026

(54) CONTAINED GAS RECIRCULATION SYSTEM FOR A VEHICLE

(71) Applicant: Alfred Dennis Belen, III, Ransomville, NY (US)

(72) Inventor: Alfred Dennis Belen, III, Ransomville, NY (US)

(73) Assignee: Belen Aerospace Corporation, Ransomville, NY (US)

( * ) Notice: Subject to any disclaimer, the term of this patent is extended or adjusted under 35 U.S.C. 154(b) by 0 days.

(21) Appl. No.: 18/406,367

(22) Filed: Jan. 8, 2024

(65) Prior Publication Data

US 2024/0140620 A1 May 2, 2024

Related U.S. Application Data

(63) Continuation of application No. 17/822,471, filed on Aug. 26, 2022, now abandoned.

(60) Provisional application No. 63/266,118, filed on Dec. 29, 2021.

(51) Int. Cl.

| | |
|---|---|
| ***B64G 1/44*** | (2006.01) |
| ***B64G 1/40*** | (2006.01) |
| ***B64G 1/60*** | (2006.01) |
| ***F03H 99/00*** | (2009.01) |

(52) U.S. Cl.
CPC ................ *B64G 1/44* (2013.01); *B64G 1/411* (2023.08); *B64G 1/60* (2013.01); *F03H 99/00* (2013.01)

(58) Field of Classification Search
CPC .. B64G 1/44; B64G 1/409; B64G 1/60; F03H 99/00
See application file for complete search history.

(56) References Cited

U.S. PATENT DOCUMENTS

| | | | | |
|---|---|---|---|---|
| 7,303,166 | B2 * | 12/2007 | Geery | B64B 1/24 244/30 |
| 7,966,833 | B2 | 6/2011 | Beutin et al. | |
| 8,720,205 | B2 | 5/2014 | Lugg | |
| 9,109,538 | B2 | 8/2015 | Maalioune | |
| 10,538,337 | B2 | 1/2020 | Vondrell et al. | |
| 10,703,496 | B2 | 7/2020 | Vondrell et al. | |
| 10,941,707 | B1 | 3/2021 | Berkey et al. | |

(Continued)

OTHER PUBLICATIONS

The Jet Engine: A Historical Introduction (Year: 2004).*

(Continued)

*Primary Examiner* — Richard Green
*Assistant Examiner* — Nevena Aleksic
(74) *Attorney, Agent, or Firm* — Dunlap Bennett & Ludwig PLLC; Anna L. Kinney

(57) ABSTRACT

A vehicle including a sealed container, a propulsion system with an intake and an exhaust affixed to an interior of the sealed container, an exhaust stream emitted from the exhaust, a thrust corridor within the sealed configured to channel the exhaust stream, and a return corridor configured to channel an intake stream into the intake of the propulsion system wherein the exhaust stream transforms into the intake stream after traveling a sufficient distance within the sealed container and the exhaust stream and intake stream generate a pressure differential within the sealed container wherein the pressure differential is sufficient to result in a movement of the vehicle relative to the vehicle's surroundings.

12 Claims, 1 Drawing Sheet

(56) References Cited

U.S. PATENT DOCUMENTS

| | | | |
|---|---|---|---|
| 10,968,765 B2 | 4/2021 | Gemin | |
| 10,988,223 B2 | 4/2021 | Oran | |
| 2004/0065086 A1 | 4/2004 | Filippone | |
| 2005/0210862 A1 | 9/2005 | Paterro | |
| 2006/0228959 A1 | 10/2006 | Ruiz | |
| 2010/0248562 A1 | 9/2010 | Daikoku | |
| 2013/0181095 A1* | 7/2013 | Akhmejanov ........ | B64C 39/001 244/23 C |
| 2014/0158817 A1 | 6/2014 | Chambers | |
| 2018/0195407 A1 | 7/2018 | Kudrna et al. | |
| 2018/0354631 A1 | 12/2018 | Adibhatla et al. | |
| 2019/0148027 A1* | 5/2019 | Rhyne ...................... | F02C 1/05 376/317 |
| 2020/0052570 A1 | 2/2020 | Holcomb | |
| 2021/0039777 A1 | 2/2021 | Gamzon | |
| 2021/0131355 A1 | 5/2021 | Szarvasy et al. | |
| 2021/0172384 A1 | 6/2021 | Brown et al. | |

OTHER PUBLICATIONS

Flight Safety Digest: Understanding Airplane Turbofan Engine Operation Helps Flight Crews Respond to Malfunctions (Year: 2001).*

International Search Report and Written Opinion; PCT/US22/42844; Mailed Jan. 3, 2023.

* cited by examiner

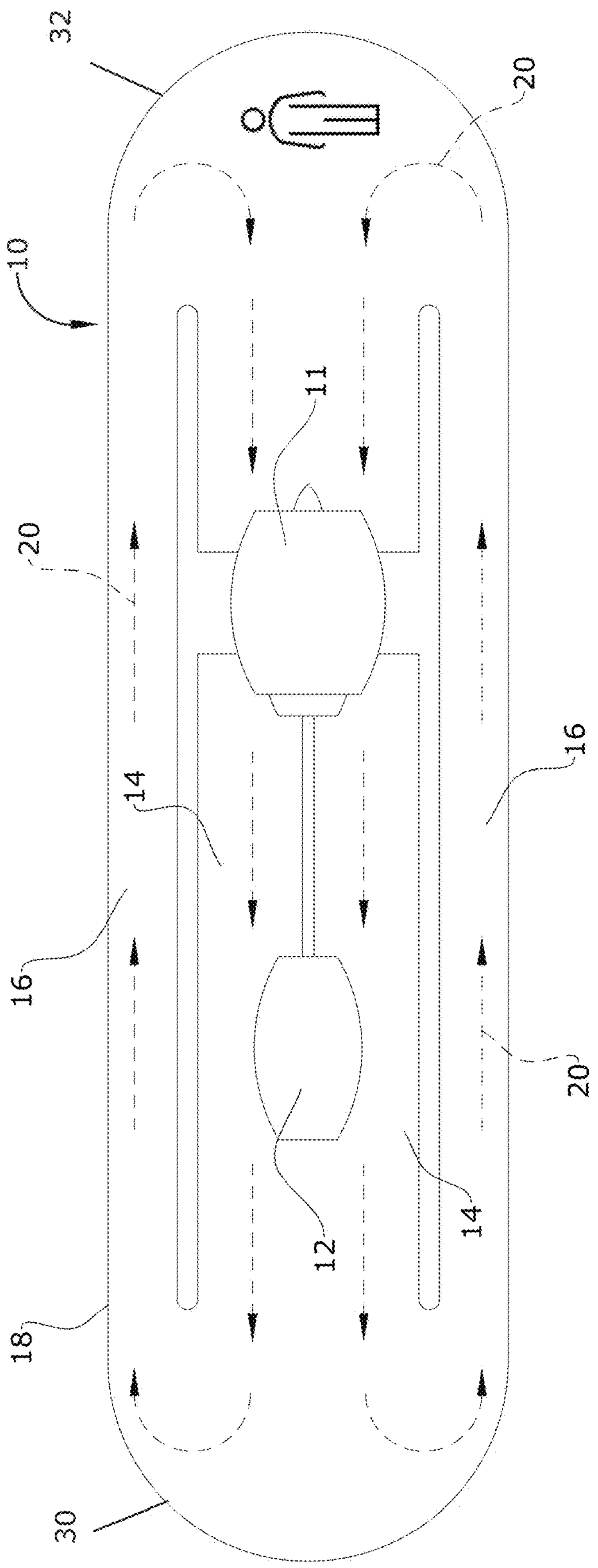
32
20
10
11
20
16
14
16
20
14
12
18
30

CONTAINED GAS RECIRCULATION SYSTEM FOR A VEHICLE

CROSS-REFERENCE TO RELATED APPLICATION

This application is a continuation of U.S. nonprovisional application Ser. No. 17/822,471, filed Aug. 26, 2022. Application Ser. No. 17/822,471 claims the benefit of priority of U.S. provisional application No. 63/266,118, filed Dec. 29, 2021. The contents of U.S. application Ser. No. 17/822,471 and 63/266,118 are herein incorporated by reference.

BACKGROUND OF THE INVENTION

The present invention relates to a vehicle with a propulsion system and, more particularly, to a vehicle with a propulsion system enclosed in a sealed container.

Current propulsion systems are expensive due to fuel consumption, as fuel in the system is not recyclable. Presently, a propeller or jet turbine type propulsion system generates a force, such as thrust. The thrust is formed as an air stream or matter is ejected or propelled away from a vehicle. The air stream or matter ejected is not recycled and is lost to the vehicle's system.

Traveling between solar bodies such as in interplanetary travel, would be more efficient if resources were not being ejected into space. Current propulsion systems used in space rely on an ejection of matter to propel a spacecraft. Once ejected, the matter is lost in space. If this matter could be recycled, it would make interplanetary travel more efficient. However, no systems for recycling matter or an air stream with a propulsion system currently exist. Enclosing the propulsion system within a sealed, even airtight, container may enable propulsion in space or underwater.

As can be seen, there is a need for a propulsion system in an enclosed container that enables recycling of ejected matter while propelling a vehicle.

SUMMARY OF THE INVENTION

In one aspect of the present invention, a vehicle comprises a sealed container, a propulsion system with an intake and an exhaust affixed to an interior of the sealed container, an exhaust stream emitted from the exhaust of the propulsion system, a thrust corridor within the sealed container, positioned adjacent to the exhaust of the propulsion system configured to channel the exhaust stream, and a return corridor within the sealed container, positioned adjacent to the intake of the propulsion system configured to channel an intake stream into the intake of the propulsion system wherein the exhaust stream transforms into the intake stream after traveling a sufficient distance within the sealed container wherein the exhaust stream and intake stream generate a pressure differential within the sealed container wherein the pressure differential is sufficient to result in a movement of the vehicle relative to the vehicle's surroundings.

These and other features, aspects and advantages of the present invention will become better understood with reference to the following drawings, description, and claims.

BRIEF DESCRIPTION OF THE DRAWINGS

The FIGURE is a schematic view of a vehicle in a sealed container according to an embodiment of the present invention.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

A general overview of the various features of the invention will be provided, with a detailed description following. Broadly, an embodiment of the present invention provides a propulsion system enclosed in a sealed container.

The propulsion of the present invention may be a propeller or a turbine. A main or primary fuel source for the system may be electricity so as to remove the need for costly and expendable chemical reactions and/or fossil fuels. Said electricity may be generated by solar power. An electric turbine, an electric propellor, and/or an electric motor may enable thrust production via electrical means instead of chemical fuels.

The propulsion system is enclosed in and affixed to an interior of a sealed or airtight container. The sealed container may form, enclose, and/or encompass a vehicle system.

A steering mechanism may be equipped to the container to direct or steer the container. Such steering mechanism may be a rudder.

In some embodiments of the present invention, the atmosphere within the container forms streams including at least one exhaust stream and at least one return stream. The return stream may also be referred to as an intake stream. The exhaust stream may be ejected from a rear end of the propulsion system or an exhaust end. The exhaust stream may be redirected or deflected by a wall or a chamber to a front end of the propulsion system. The walls may form a thrust corridor, for the exhaust stream to exit to propulsion system, and a return corridor, for the exhaust stream to return an entrance of the propulsion system. By traveling through the return corridor, the exhaust stream may then re-enter the propulsion system at an intake section. The sealed container of the present invention enables the exhaust stream to be recycled and reused indefinitely without the exhaust stream escaping the sealed container.

The propulsion system may include an intake and an exhaust. The exhaust may emit or release an exhaust stream. The exhaust stream may be an expanded or expanding gas. After traveling a sufficient distance, the exhaust stream may circulate, circle, navigate, or travel the sealed container and transform to the intake stream. The thrust corridor may simultaneously transform to the return corridor when the exhaust stream transforms into the intake stream. This may be when the expanding gas is no longer expanding or when a pressure differential caused by the exhaust stream changes sufficiently.

The intake stream may re-enter the propulsion system. In some embodiments, no portion of the intake stream or the exhaust stream exits the sealed container or the vehicle system.

The walls may be affixed to an interior of the sealed container. The propulsion system including the motor may be affixed to the sealed container. The propulsion system may be affixed to the sealed container by the walls. The walls and motor may form an H structure within the sealed container.

The walls may channel or guide the intake stream and exhaust stream in navigating the interior of the sealed container.

A propulsion system generating thrust may be placed within the airtight container. For example, the propulsion system may comprise an electrical motor connected to a propeller blade. The propulsion system may be activated. The airtight container will then travel across or through a medium. The container may travel through a body of space, air, or water. Alternatively, the present invention may travel across a surface of water.

In some embodiments of the present invention, the atmosphere enclosed in the sealed container may be dense atmosphere relative to Earth's atmosphere. The dense atmosphere may be composed of a noble gas such as Argon. The atmosphere may be oxygen rich or an oxygen-nitrogen mixture. The atmosphere may be similar to Earth's atmosphere and be a breathable atmosphere.

The sealed container may house passengers and/or cargo. A portion of the container may be dedicated for passengers and/or cargo. Said portion may be protected from the exhaust stream.

The sealed container may be sufficiently large enough to contain and house passengers or at least one person for a sufficient period of time in a comfortable fashion. For example, the sealed container may provide a sleeping area, a bathroom, and/or a dining area as would be appropriate for an extended period of travel ranging from hours to days or weeks. The sealed container may provide enough space and adequate facilities to sustain and support at least one passenger for said periods of time.

In some embodiments, the solar charging unit may be electronically wired to a motor of the propulsion system and power the motor. The solar charging unit may be positioned on an outside of the sealed container or on an inside of the sealed container. In some embodiments of the present invention, the sealed container or portions thereof are transparent. The transparency of the container may enable charging of the solar charging unit as the sealed container may be configured to provide or expose the solar charging unit to solar energy emanating from an outside of the sealed container.

In some embodiments, the propulsion system may be mechanical/caloric.

A shape of the container is not particularly limited. The container may be any shape suitable for housing a propulsion system such as a sphere, cylinder, or heart shape. In some embodiments, the propulsion system may be at an apex of the heart shape whereas return corridors or thrust corridors are formed by segments of the heart.

In some embodiments of the present invention, the thrust corridor comprises gasses being release from the propulsion system or expanding. The return corridor comprises gasses being compressed or collected by the propulsion system. The thrust corridor may be adjacent to the exhaust of the propulsion system. The return corridor may be adjacent to the intake of the propulsion system.

A relative change in pressure or pressure differential, resulting from the propulsion system, an expansion/compression of gasses thereby, and/or the intake and exhaust stream may result in a movement of the vehicle system and the sealed container relative to its surroundings. The pressure differential inside of the sealed container may be sufficient enough to cause the vehicle movement. The movement may be in a direction opposite of the exhaust stream and controller by a steering mechanism or rudder.

In some embodiments, gasses within the thrust corridor may expand without hinderance or resistance from a shape of the corridor. The thrust corridor may be of a sufficient length to not impede a flow of the movement of the gases in the thrust corridor. Nozzles may be incorporated to modify gas flow.

The return corridor, also referred to as an atmosphere return corridor, may be a distance from the propulsion system. The return corridor may direct gas within the sealed container to the propulsion system for compression. This process may repeat as long as a sufficient fuel source is present.

Referring now to the FIGURE, the FIGURE shows a schematic view of a vehicle system 10 enclosed by a container 18 according to an embodiment of the present invention. An electric motor 12 drives a turbine engine 11. The turbine engine 11 forces an exhaust stream 20 down a thrust corridor 14 to a first end 30 of the container 18. The exhaust stream 20 may be a fluid such as air. The exhaust stream 20 is guided by a wall of the container 18 to a return corridor 16 where it is further guided to a second end 32 of the container 18. The exhaust stream 20 re-enters the turbine engine 11 where it is once again forced down the thrust corridor 14.

It should be understood, of course, that the foregoing relates to exemplary embodiments of the invention and that modifications may be made without departing from the spirit and scope of the invention as set forth in the following claims

What is claimed is:

1. A contained gas recirculation system comprising:
- a sealed container forming a vehicle;
- a circulation system with an intake and an exhaust affixed to an interior of the sealed container, comprising an electric motor operatively coupled to a gas moving element configured to circulate gas within the sealed container;
- an exhaust stream emitted from the exhaust of the circulation system;
- a thrust corridor within the sealed container, positioned adjacent to the exhaust of the circulation system configured to channel the exhaust stream; and
- a return corridor within the sealed container, positioned adjacent to the intake of the circulation system configured to channel an intake stream from the thrust corridor into the intake of the circulation system;
- wherein the exhaust stream transforms into the intake stream after traveling a sufficient distance within the sealed container; and
- wherein during operation of the circulation system, the exhaust stream recirculates within the sealed container without exiting the sealed container.

2. The contained gas recirculation system of claim 1, wherein the gas moving element is an electric turbine and the electric motor is operative to drive the electric turbine.

3. The contained gas recirculation system of claim 2, wherein the electric motor is powered by a solar charging unit.

4. The contained gas recirculation system of claim 3, wherein the solar charging unit is positioned on an outside of the sealed container and electronically wired to the electric motor.

5. The contained gas recirculation system of claim 3, wherein the solar charging unit is positioned on an inside of the sealed container and electronically wired to the electric motor wherein at least a portion of the sealed container is transparent and configured to provide the solar charging unit with solar power emanating from an outside of the sealed container.

6. The contained gas recirculation system of claim 1, wherein the gas moving element is an electric propeller and the electric motor is operative to drive the electric propeller.

7. The contained gas recirculation system of claim 6, wherein the electric motor is powered by a solar charging unit.

8. The contained gas recirculation system of claim 7, wherein the solar charging unit is positioned on an outside of the sealed container and electronically wired to the electric motor.

9. The contained gas recirculation system of claim 7, wherein the solar charging unit is positioned on an inside of the sealed container and electronically wired to the electric motor wherein at least a portion of the sealed container is transparent and configured to provide the solar charging unit with solar power emanating from an outside of the sealed container.

10. The contained gas recirculation system of claim 1, wherein the sealed container contains a breathable atmosphere.

11. The contained gas recirculation system of claim 1, wherein the sealed container is dimensioned to further contain at least one person.

12. The contained gas recirculation system of claim 1, wherein the circulation system further comprises walls affixed to the interior of the sealed container, wherein the walls guide the exhaust stream and an intake stream in navigating the interior of the sealed container.

* * * * *